United States Patent [19]

Way

[11] 3,780,278

[45] Dec. 18, 1973

[54] BINARY SQUARING CIRCUIT

[75] Inventor: John L. Way, La Canada, Calif.

[73] Assignee: E. I. du Pont de Nemours and Company, Wilmington, Del.

[22] Filed: Mar. 10, 1971

[21] Appl. No.: 122,812

[52] U.S. Cl. .............................................. 235/164
[51] Int. Cl. .............................................. G06f 7/52
[58] Field of Search .............................................. 235/164

[56] References Cited

UNITED STATES PATENTS

| | | | |
|---|---|---|---|
| 3,379,865 | 4/1968 | Sinniger | 235/164 X |
| 3,582,634 | 6/1971 | Bartlett | 235/164 |
| 3,610,906 | 10/1971 | Stampler | 235/164 |
| 3,610,907 | 10/1971 | Taylor | 235/164 |

*Primary Examiner*—Eugene G. Botz
*Assistant Examiner*—David H. Malzahn
*Attorney*—Eugene F. Friedman

[57] ABSTRACT

An apparatus and method for squaring digital binary numbers which operates in cycles starting with the most significant bit followed by the less significant bits in sequence. If the bit being operated upon is a ONE, the smaller number formed from the bits having greater significance than this bit are added to the square of this smaller number (previously determined). The significance of each bit in this sum is increased by two and ONE placed at its least significant bit. However if the bit being operated upon is a ZERO; then the significance of each bit of the square of the smaller number formed from the bits having greater significance than this bit is increased by two and ZERO's placed in the least significant positions.

15 Claims, 4 Drawing Figures

INVENTOR
JOHN L. WAY
BY Eugene F. Friedman
AGENT

FIG. 2
| CYCLE | BINARY NUMBER AND SQUARE | DECIMAL NO. AND SQUARE |
|---|---|---|
| 1 | 1<br>1 | 1<br>1 |
| 2 | 0 1<br>0 0 1 | 2<br>4 |
| 3 | 1 0 1<br>1 0 0 1 1 | 5<br>2 5 |
| 4 | 1 1 0 1<br>1 0 0 1 1 1 1 | 1 1<br>1 2 1 |
| | → INCREASING SIGNIFICANCE | |
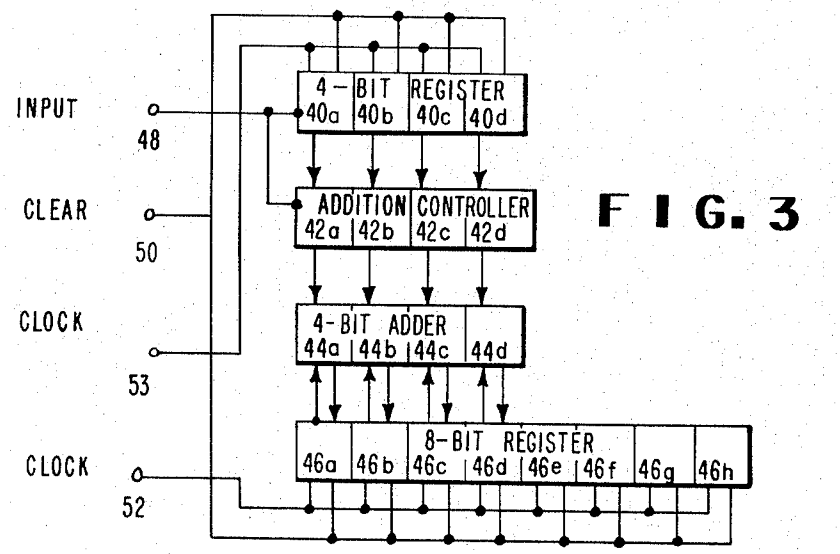
FIG. 3
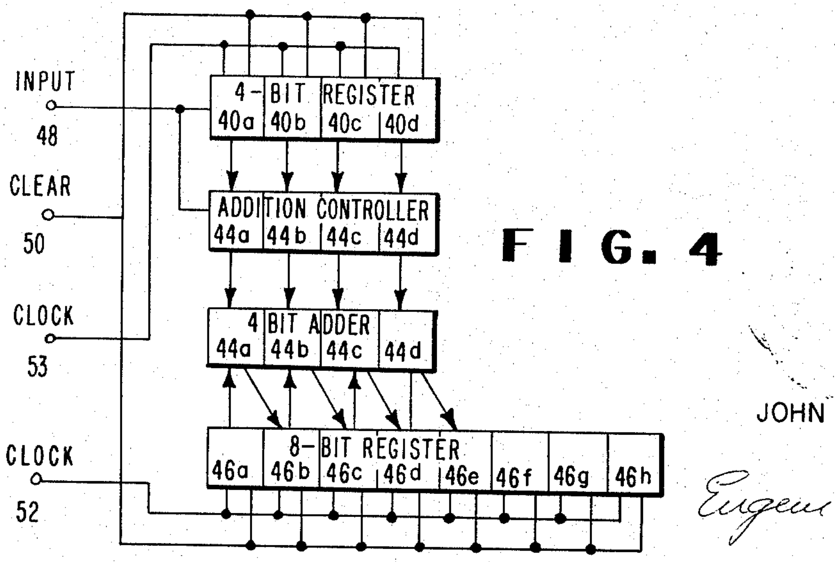
FIG. 4
INVENTOR
JOHN L. WAY
Eugene F. Friedman
AGENT

BINARY SQUARING CIRCUIT

BACKGROUND OF THE INVENTION

This invention relates to a device and method for squaring a binary number. It is suitable for digital computation especially where the binary number appears serially with the most significant bit appearing first.

In many physical investigations, the value of the desired parameter is proportional to the square of the physical effect being measured. For example, in mass spectrometry, a Hall device may be used to measure the magnetic field intensity. The mass of the particles entering a collector is then related to the magnetic field by the equation $$m/e = k(H^2/V)$$

where:

$H$ = magnetic field strength
$m$ = mass of the particle
$e$ = charge of the particle
$V$ = ion acceleration voltage
$k$ = constant Thus it is desired to calculate the square of the magnetic field strength $H$.

A number of presently available multiplying devices will serve to square a binary digital number. However, these devices use the number to be squared both as the multiplier and the multiplicand. In general, to allow for a different multiplier and multiplicand, such multiplying devices require more components and greater complexity than a circuit whose sole function is to square a binary number. Further, such multiplying circuits will generally take longer than a circuit designed solely for squaring. The devices in U.S. Pat. No. 3,302,008 to R. W. Mitchell, Jr. and U.S. Pat. No. 3,456,098 to E. Gomez et al., for example, display separate registers for the multiplier and the multiplicand, have complex networks to accomplish the multiplying function, and require $2n$ computer cycles, where $n$ is the number of bits in the binary number.

Thus, it is an object of this invention to provide a simplified, fast apparatus and method for squaring a binary number, which will find particular utility in a digital computation apparatus in which the number to be squared appears serially starting with the most significant bit.

SUMMARY OF THE INVENTION

These and other objects are accomplished by an apparatus and method which operates cyclically upon the binary number, one cycle for each bit, starting with the most significant bit. When the bit being operated upon is a ONE, the present invention adds the smaller number formed from the bits in sequence having greater significance than the operated upon bit to its square (previously formed by prior cycles). For example, where the $(i+1)^{th}$ most significant bit is being operated upon the $i$ most significant bits in sequence form the binary number to be added to its square when the $(i+1)^{th}$ most significant bit is ONE. Then this sum is shifted two positions in the direction of increased significance, a ZERO placed in the second from last position and a ONE in the least significant position. When the operated upon bit is a ZERO, then the present invention merely shifts the square of the smaller number formed from the bits having greater significance than the operated upon bit two positions in the direction of increasing significance and places ZERO's in the two positions of least significance.

Many advantages result from this apparatus and method. Storage need only be provided for one number in addition to the resulting square. The apparatus requires only a minimum of components to perform the addition and shifting functions. Further, since during a cycle the invention utilizes only those bits having significance greater than the operated-upon bit, the apparatus and method operates continuously and the completion of the last cycle operating upon the last bit completes the entire squaring procedure.

BRIEF DESCRIPTION OF THE DRAWINGS

FIG. 2 contains a table showing the results of each cycle of computation in the squaring of an example four-bit number.

FIG. 3 shows in block form an alternate to the apparatus shown in FIG. 1.

FIG. 4 shows in block form a second alternate to the apparatus shown in FIG. 1.

DETAILED DESCRIPTION OF THE INVENTION

Figure 1:
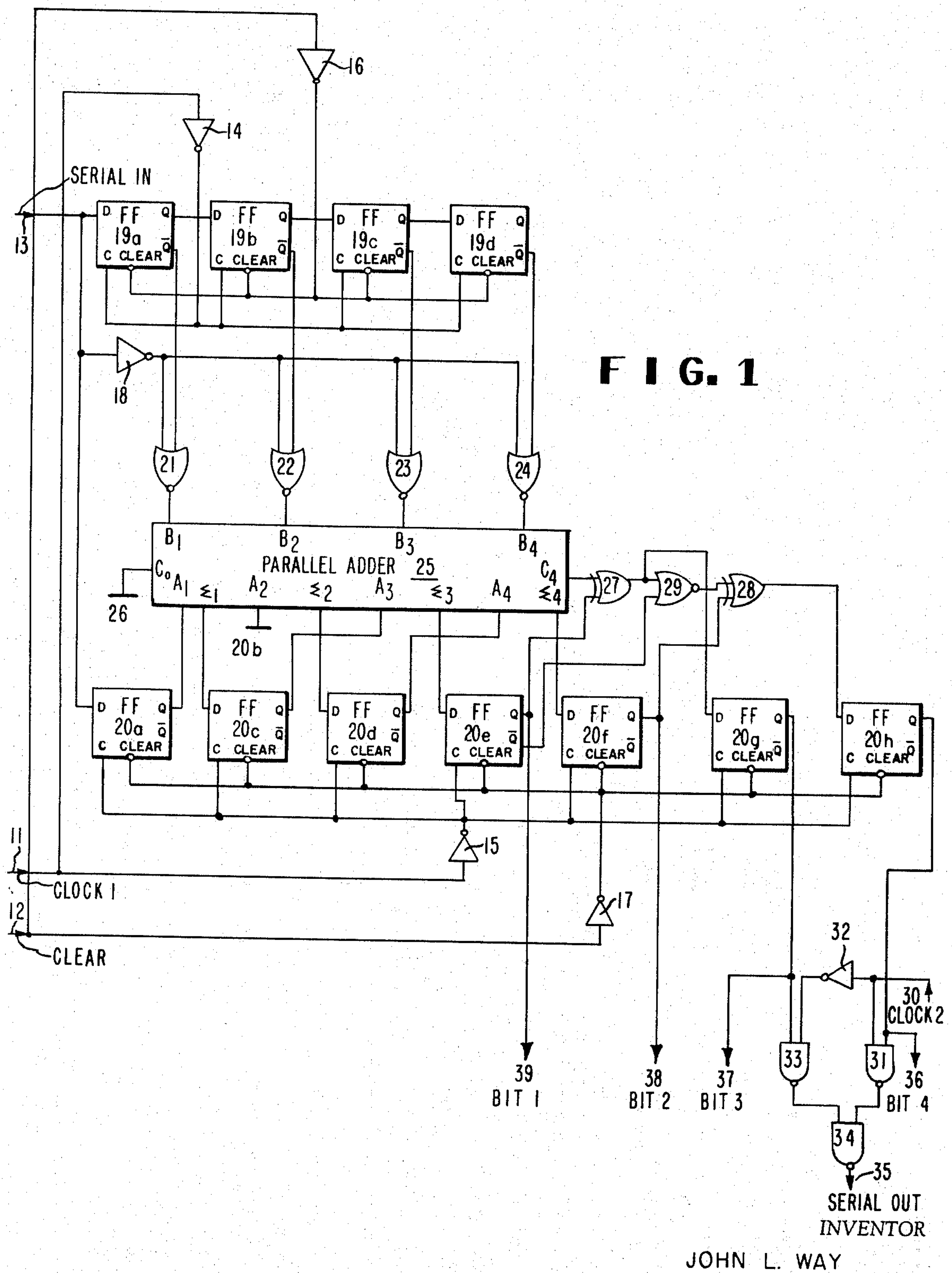
FIG. 1 shows a schematic diagram of an embodiment of the present invention.

The present invention makes use of the fact that in binary arithmetic shifting each bit in a number to a position having an increase of ONE is equivalent to multiplying that number by two. This is analogous to decimal arithmetic where a similar shifting multiplies a number by ten. For example, in the number 23, shifting each digit to a position having an increase of ONE in significance results in the number 230. (In a number system the "significance" of a digit in a number is the power of the base number represented by that digit. Increasing the significance of a digit by one, also stated as increasing the significance of the digit one-fold, means to multiply that digit by the base number. Increasing the significance of a number connotes multiplying the entire number by the base number. Similarly to increase the significance of a digit or number by two means to multiply it by the square of the base number.)

The present invention performs its computations in cycles, with one cycle for each bit in the binary number to be squared. The first cycle operates upon the most significant bit and the succeeding cycles on the less significant bits. During each cycle there is available the smaller binary number formed from the bits in sequence of the number to be squared having significance greater than the operated-upon bit. Also available during each cycle is the square of this above-mentioned smaller number, which prior cycles of the procedure will have calculated.

If the bit being operated upon during a cycle has the value ONE, then the above-mentioned smaller number will be added to its square. Also, during this cycle, this sum will be shifted two positions in the direction of increased significance. Lastly, ZERO is placed in the second from last position in this shifted number and a ONE in the last position. If the operated upon bit is ZERO, then no addition occurs during this cycle but the square of the smaller binary number is merely shifted two positions in the direction of increased significance, and ZERO's placed in the last two positions of the shifted number.

Thus, the procedure involves shifting a number two positions in the direction of increasing significance and adding the value of the operated upon bit in the last position of the shifted number. When the operated upon bit is ONE, the smaller binary number is added to its square; whereas when it is ZERO, no addition takes place. Lastly, at the conclusion of a cycle, the above-mentioned smaller number may be expanded to include, as its least significant bit, the bit that was operated upon during that cycle. This prepares the smaller binary number for the next cycle. Clearly, this procedure is particularly suitable for an apparatus that provides a number to be squared serially, with the most significant bit appearing first. An example of an apparatus which provides a number in this fashion is the Mass Marker/Indicator accessory to the Du Pont Model 492 Mass Spectrometer (manufactured by the E. I. du Pont de Nemours & Co., Wilmington, Del.).

The procedure characterizing the present invention is clearly valid for the most significant bit of the number to be squared, whether this bit is defined to be the most significant bit of the number or its first non-zero bit. For the trivial example of the first bit being ZERO, the cycle that operates on this bit would merely shift the number ZERO two positions in the direction of increased significance and place ZERO's in the two positions of least significance. This gives the number ZERO as the square of the number ZERO which becomes the smaller binary number for the next cycle.

When the first bit is ONE (perhaps by definition), the procedure during the cycle operating on this bit will add ZERO (the smaller number) to ZERO (the square of the smaller number) to form the sum of ZERO; shift this sum two positions in the direction of increasing significance; and place ZERO in the second least significant position and ONE in the least significant position of the shifted number to give the final result of ONE. The bit ONE, which was operated upon, becomes the smaller binary number for the next cycle, and it is seen that its square, the number ONE, has been calculated by the present invention.

More generally, during the particular cycle when the samller number is $S$ and its square $S^2$ has been made available by prior cycles, the next bit must be ZERO or ONE. At the conclusion of this particular cycle, this operated upon bit will be incorporated as a least significant bit to form this smaller binary number for the next cycle with the significance of the rest of the bits in the prior smaller binary number being increased by one. Because of binary arithmetic, shifting the bits to positions having an increase in significance of one is equivalent to multiplying the original smaller binary number $S$ by 2. When the operated upon bit is thus incorporated into the smaller binary number the result must be $2S + 0 = 2S$ if the operated upon bit was ZERO, or $2S + 1$ if the operated upon bit was ONE. In either case, as appropriate, the procedure, by using $S$ and $S^2$ (previously determined) must calculate the squares of these numbers (i.e., $4S^2 = (2S)^2$ when the operated upon bit was ZERO, and $4S^2 + 4S + 1 = (2S + 1)^2$ when the bit was ONE).

For the case where the operated upon bit is ZERO: For this case, the present invention shifts the number $S^2$ two positions in the direction of increased significance, which, in binary arithmetic, is equivalent to multiplying $S^2$ by 4, giving the result $4S^2$. This is clearly the square of the number formed by incorporating the operated upon bit, ZERO, into $S$ which is $2S$.

For the case where the operated upon bit is ONE: In this case, the smaller binary number $S$ is added to its square $S^2$ to form the sum $(S^2 + S)$. The procedure then shifts this sum two positions in the direction of increased significance, which multiplies the sum by 4 to give $4(S^2 + S) = 4S^2 + 4S$. The number ONE (the value of the bit being operated upon) is then added to this sum which to give $4S^2 + 4S + 1 = (2S + 1)^2$. This is the square of the binary number $(2S + 1)$ which, by above, was formed by incorporating the operated upon bit into the smaller binary number $S$.

Thus given the binary number $S$, its square $S^2$ and the next significant bit, this procedure correctly calculates the square of the number formed from incorporating this bit into $S$. From this and the fact that the procedure operates correctly for the first bit, the procedure must be valid for an $n$-bit binary number, regardless of the magnitude of $n$.

An apparatus for performing this procedure to square a 4-bit binary number is shown in FIG. 1. Four flip-flops 19*a*, 19*b*, 19*c*, and 19*d* constitute a 4-bit register 19 to store the binary number to be squared. Seven flip-flops, 20*a*, 20*c*, 20*d*, 20*e*, 20*f*, 20*g* and 20*h* partially constitute an 8-bit register 20 to store the square of the binary number. In registers 19 and 20, flip-flops 19*a* and 20*a* represent the least significant bits in the register, respectively, and 19*d* and 20*h* represent the most significant bits. It is not necessary to have a flip-flop for the second least significant bit in the resulting square; the above procedure always places a ZERO in this position. Accordingly the flip-flop 20*b* is permanently held at a voltage indicative of the number ZERO and represents the second least significant bit. To increase the significance of a bit or number in register 19 or 20 by one or two, it is merely required to shift it one or two positions in the direction of increased significance, i.e., towards 19*d* or 20*h* respectively.

The clear terminal 12 provides positive pulses which inverter 16 converts into negative pulses which are fed to the "clear" of the flip-flops 19*a*, 19*b*, 19*c* and 19*d* of the 4-bit register. Similarly, inverter 17 provides negative pulses for the flip-flops 20*a*, 20*c*, 20*d*, 20*e*, 20*f*, and 20*g* of the 8-bit register. At each of the flip-flops in both registers the negative pulse at their "clear" input overrides at other inputs and sets the output Q of each flip-flop to 0 and the output $\overline{Q}$ to 1.

The clock-1 terminal 11 provides a positive pulse at the beginning of each cycle which inverter 14 converts to a negative pulse at the C input of each of the four flip-flops 19*a*, 19*b*, 19*c* and 19*d* of the 4-bit register. Similarly inverter 15 converts the clock-1 pulse into a negative pulse which is transmitted to the C inputs of each of the seven flip-flops which partially constitute the 8-bit register. In the absence of a clear signal, the clock pulse takes the number appearing at the D input of each flip-flop before the clock pulse and places it at the output Q and its converse (i.e., 0 if Q is 1 and vice versa) at the output $\overline{Q}$ of that flip-flop after the clock pulse.

After a clear command clears both registers, the serial-in 13 provides the number to be squared serially with the most significant bit appearing first. Each bit of this number to be squared is fed into the D input of flip-flop 19*a*, representing the least significant bit of the 4-bit register, and the D input of flip-flop 20*a* representing the least significant bit of the 8-bit register. Inverter 18 presents the converse of the input from serial-in 13 to one of the inputs of each of the NOR (i.e., Negative OR) gates 21, 22, 23 and 24. The second input of the NOR gates 21, 22, 23 and 24 connects to the $\overline{Q}$ input of the flip-flops 19*a*, 19*b*, 19*c* and 19*d* respectively. Since a NOR gate's output will be 0 unless both of its inputs are 0, the outputs of the NOR gates 21, 22, 23 and 24 will be 0 unless in particular the output of inverter 18 is 0. However, the output of inverter 18 is 0 only when its input, which is the bit being operated upon at serial-in 13 is 1. Thus the four NOR gates 21, 22, 23 and 24 control the addition of the 4-bit register to the 8-bit register. It will isolate the 4-bit register from the 8-bit register unless the operated-upon bit at serial-in 13 is 1, in which case it will allow the addition of the 4-bit register to the 8-bit register as required by the present invention.

When a 1 at serial-in 13 enables NOR gates 21, 22, 23 and 24, their outputs will be 1 when the $\overline{Q}$ outputs of flip-flops 19*a*, 19*b*, 19*c* and 19*d* respectively are 0 and vice versa, i.e., when enabled, the output of each NOR gate is the converse of the $\overline{Q}$ output to which it is attached. However, the $\overline{Q}$ output itself represents the converse of the bit stored in a flip-flop. Thus, when a 1 at serial-in 13 enables NOR gates 21 through 24, the output of each will be the value of the bit stored in the flip-flop to which it is connected and will be available for addition to the 8-bit register 20.

Parallel adder 25 accomplishes the addition of the 4-bit register 19 to the 8-bit register 20 through NOR gates 21 to 24. The 4-bit parallel adder 25 may be considered to consist of four separate adders each of which has three inputs and two outputs. The three inputs, A, B and $C_{in}$ of one adder may each be 0 or 1. The adder sums the three inputs and expresses the result as a binary number at the outputs $\Sigma$ and $C_{out}$ where $\Sigma$ represents the 1 and $C_{out}$ represents the 2 in the binary sum. Thus $\Sigma$ will be 1 if one or three of the inputs are 1; and 0 otherwise. $C_{out}$ will be 1 if two or three of the inputs are 1; and 0 otherwise. The 4-bit parallel adder internally connects the $C_{out}$ from one adder into the $C_{in}$ of the adder of the next significant bits if that adder is part of the same 4-bit parallel adder. Thus, for example, that portion of the parallel adder which adds $A_2$ and $B_2$ also has, as an input, the carry from the addition of $A_1$ and $B_1$, and has, as an output, the carry from this sum which is internally connected as an input to the adder for $A_3$ and $B_3$. In parallel adder 25 the $C_{in}$ for the adder of the least significant bits is not provided internally, since parallel adder 25 itself has no less significant adder. Rather the carry into the least significant adder is provided externally through $C_o$ which, in this circuit, is maintained at the value of 0 at 26. Similarly the carry output of the adder of $A_4$, $B_4$ and their carry must be provided externally and is so at $C_4$. Thus, for example, parallel adder 25 adds $A_1$ and $B_1$, providing the sum at $\Sigma_1$, with the carry automatically going into the summation of $A_2$ and $B_2$ whose sum is provided at $\Sigma_2$ and so on.

Parallel adder 25 and its connections also accomplish part of the shifting in the present invention. It achieves this by placing the $\Sigma$ output of each adder not at the flip-flop in the 8-bit register from which that adder received one of its inputs, but rather at the flip-flop that has an increase of two in significance. Thus, $\Sigma_3$, for example, which represents the sum obtained by adding the third least significant bits is connected to the input of the fifth least significant flip-flop 20*e*.

Exclusive OR gates 27 and 28 and NOR gate 29 accomplish the remainder of the shifting function. These gates also permit the addition of any carry out of parallel adder 25 at $C_4$ that may be required. Thus if $C_4$ and flip-flop 20*e* which provide the two inputs to Exclusive OR gate 27, are both 1 (with a binary sum of 10) the output of Exclusive OR gate 27 will be 0 since such a gate has an output of 1 if and only if one of its inputs is 1 and the other 0. The 0 output of Exclusive OR gate 27 is carried to the input of flip-flop 20*g* which has an increase of two in significance over flip-flop 20*e*. The 0 output of Exclusive OR gate 27 is also connected to the input of NOR gate 29 as is the $\overline{Q}$ output of flip-flop 20*e* which must be 0 since flip-flop 20*e* has the value of 1. Both inputs of NOR gate 29 being 0, its output is 1 which is passed to one of the inputs of Exclusive OR gate 28. Flip-flop 20*f* provides the other input to Exclusive OR gate 28. If flip-flop 20*f* is 1, again the output of Exclusive OR gate 28 would be 0 and represents the input to flip-flop 20*h* having significance of 2 greater than flip-flop 20*f*. (It could appear, in this example that if both inputs into Exclusive OR gate 28 were 1, the carry of 1 from this addition would be lost since the 8-bit register 20 would have insufficient capacity. However, it is mathematically impossible to develop sufficient large numbers in both the 4-bit and 8-bit registers to result in this loss. The 8-bit register 20 is sufficiently large to contain the number 225 which is the square of 15, the largest possible 4-bit number.)

At the end of the computations, the 4-bit register 19 will contain the number to be squared, and its square will be in the 8-bit register 20. The output of the 8-bit register may be taken in parallel directly from the flip-flops of register 20 as outputs 36, 37, 38 and 39 show for the four most significant bits. Of course, all eight bits of the resulting square may also be taken in similar fashion.

Alternately clock-2 at 30, NAND gates 31, 33 and 34, inverter 32, and serial-out 35 provide for a serial output of the resulting square. Since the squaring circuit generates two significant bits for each cycle of operation, a serial output must provide two bits of input per cycle. Clock 2 at 30 permits this by remaining positive for the first half of the cycle (between clock-1 pulses) and negative for the second half. During the half cycle that clock-2 at 30 is positive, i.e., has the value 1, inverter 32's output is 0. This causes NAND gate 33 which provides one input to NAND gate 34, to have the value 1 during this half cycle since a NAND gate is 0 if and only if both inputs are 1. Since the input to NAND gate 31 from clock-2 is 1 its output will be 0 if flip-flop 20*h* is 1 and vice versa. Since the input into NAND gate 34 from NAND gate 33 is 1 during the first half cycle its output will be 0 if the output from NAND gate 31 is 1 and vice versa. Thus, during the first half cycle, the output of NAND gate 34 is the opposite of the output of NAND gate 31, which is the opposite of flip-flop 20*h*, i.e. the output of NAND gate 34 at serial-out 35 is the most significant bit in the 8-bit register 20 at 20*h*. During the second half cycle, the clock-2 output 0 forms one input to NAND gate 31 and, through inverter 32, provides a 1 input to NAND gate 33. During the second half cycle, the roles of NAND gates 31 and 33 are reversed and, accordingly, the output at serial-out 35 from NAND gate 34 will be one if the second most significant bit in the 8-bit register 20 at flip-flop 20*g* is 1 and 0 if this flip-flop is 0. The next pulse from clock-1 at 11 will shift the contents of 8-bit register 20 two positions in the direction of increased significance, bringing the next two most significant bits of the square into flip-flop 20*g* and 20*h*. These bits are then provided at serial-out 35 in the same fashion as above.

The circuit in FIG. 1 may be expanded to square larger binary numbers. For each additional bit in the number to be squared, the circuit will require an additional flip-flop in register 19, two more flip-flops in register 20, an additional unit of adder, a further NOR gate between register 19 and the adder, and an additional unit of Exclusive OR gate - NOR gate comparable to 27 and 29 respectively. These additional components would be connected in a similar fashion to those already in FIG. 1.

EXAMPLE

Operation of the circuit of FIG. 1 will be shown in squaring the number 11. FIG. 2 shows a table displaying the contents of the 4-bit register 19 and 8-bit register 20 during each cycle with their decimal equivalents. In the column labeled "Binary Number and Square", the most significant bit appears to the right and the less significant bits to the left to correspond with the physical location of the bits in registers 19 and 20. The cycles are numbered according to the most significant bit loaded into the register 19. Thus, for example, during the second cycle the second most significant bit has been loaded into flip-flop 19*a* while the third most significant bit is available at serial-in 13. Each pulse is numbered according to the cycle that it begins. Thus, the second pulse loads the second most significant bit into flip-flop 19*a* and, correspondingly, begins the second cycle.

A clear command from clear 12 begins the computation by setting the four flip-flops in 4-bit register 19 and the seven flip-flops in the 8-bit register 20 to 0. This clear command may coincide with the zeroth clock pulse or occur at any time during the zeroth cycle but before the commencement of the first clock pulse.

The most significant bit 1 appears at serial-in 13 at the conclusion of the zeroth clock pulse and is passed to the D inputs of the least significant flip-flops 19*a* and 20*a* in the 4-bit register 19 and the 8-bit register 20, respectively. This data bit 1 is converted by inverter 18 to 0 and enables NOR gates 21, 22, 23 and 24. However, since the contents of flip-flops 19*a*, 19*b*, 19*c* and 19*d* are all 0, this enabling during the zeroth cycle effectively provides no input to parallel adder 25 from the 4-bit register 19.

The next clock pulse, here labeled the "first", loads the most significant bit 1 into flip-flops 19*a* and 20*a*. This sets the Q outputs of both of these flip-flops at 1 and their $\overline{Q}$ outputs at 0. Both registers then contain the number 1 (binary and decimal) as indicated in FIG. 2 for the first cycle.

At the conclusion of the first clock pulse the second most significant bit, 0, becomes available at serial-in 13. It should be noted that it is only required that the next most significant bit be available prior to the next clock pulse, and not necessarily at the end of the previous clock pulse, for proper entry into the register and enabling of NOR gates 21, 22, 23 and 24 at the next clock pulse. However, digital computing apparatus generally make the data bits available at the conclusion of the prior clock pulse.

The second data bit 0 is converted by inverter 18 into a 1 and blocks NOR gates 21, 22, 23 and 24. Thus, the 8-bit register 20 provides the only non-zero input into parallel adder 25. Flip-flop 20*a* contains the only non-zero bit in this register. Thus, parallel adder 25 merely sums $A_1$, $B_1$ and $C_o$ of which only $A_1$ is 1, the other two being 0. Thus, the sum of $A_1$, $B_1$ and $C_o$ is 1 which appears at $\Sigma_1$, which makes it available to the D input of flip-flop 20*c*. The carry $C_1$ from the addition of $A_1$, $B_1$ and $C_o$ is 0 and provides no input to the addition of $A_2$ and $B_2$. Thus, the second clock pulse loads the 1 available from the Q output of flip-flop 19*a* into flip-flop 19*b* through its D input, which presents it as a 1 at output Q and 0 at output $\overline{Q}$; loads the 1 from the $\Sigma_1$ terminal on parallel adder 25 into flip-flop 20*c;* and loads a 0 into flip-flops 19*a* and 20*a*. Clearly the circuit operating upon a zero data bit merely shifts the number in the 8-bit register two positions in the direction of increased significance. Thus after the second clock pulse and during the second cycle, 4-bit register 19 has 0 in flip-flop 19*a* and 1 in flip-flop 19*b* which is equivalent to the decimal number 2. Simultaneously, 8-bit register 20 has a 0 in flip-flop 20*a*, 0 at 20*b* (as always) and 1 in flip-flop 20*c*, which is equivalent to the decimal number 4. During this second cycle, as shown in FIG. 2, the square of 4-bit register 19 appears in the 8-bit register 20.

Also, during the second cycle the third significant data bit, 1, is available from serial-in 13 to flip-flops 19*a* and 20*a*. This 1 passing through inverter 18 also enables NOR gates 21, 22, 23 and 24. Parallel adder 25 then performs the following additions:

a. $A_1$, $B_1$ and $C_o$ are all 0; thus $\Sigma_1$ and $C_1$(internal) are both 0.

b. $A_2$ and $C_1$ are 0 but $B_2$ is 1; thus $\Sigma_2$ is 1 and $C_2$(internal) is 0.

c. $B_3$ and $C_2$(internal) are 0 while $A_3$ is 1; thus $\Sigma_3$ is 1 while $C_3$(internal) is 0.

d. $A_4$, $B_4$ and $C_3$(internal) are all 0; thus $\Sigma_4$ and $C_4$ are also both 0.

Thus the third clock pulse loads the 1 available from flip-flop 19*b* into flip-flop 19*c* the zero from flip-flop 19*a* into 19*b* and the 1 from serial-in 13 into flip-flop 19*a*. The third clock pulse also loads the 1 from $\Sigma_3$ into flip-flop 20*e*, the 1 from $\Sigma_2$ into flip-flop 20*d*, the 0 from $\Sigma_1$ into flip-flop 20*c*, and the 1 from serial-in 13 into flip-flop 20*a*. Thus, during the third cycle, as shown in FIG. 2, the 4-bit register 19 contains 0101 (decimal 5), and the 8-bit register 20 contains 00011001 (decimal 25), which is the square of the 4-bit register.

Also, during the third cycle, the next and last significant bit 1 is available from serial-in 13 to flip-flops 19*a* and 20*a*, and through inverter gate 18 enables NOR gates 21, 22, 23 and 24 so that parallel adder 25 "sees" the data contained in 4-bit register 19. Parallel adder 25 performs the following additions:

a. $C_o$ is 0 but $A_1$ and $B_1$ are both 1; thus $\Sigma_1$ is 0 but $C_2$(internal) is 1.

b. $A_2$ and $B_2$ are 0 but $C_2$(internal) is 1; thus $\Sigma_2$ is 1 while $C_3$(internal) is 0.

c. $A_3$ and $C_3$(internal) are 0 while $B_3$ is 1; thus $\Sigma_3$ is 1 while $C_3$(internal) is 0.

d. $B_4$ and $C_3$(internal) are 0 while $A_4$ is 1; thus $\Sigma_4$ is 1 while $C_4$ is 0.

Also during this cycle, Exclusive OR gates 27 and 28 and NOR gate 29 have the following outputs:

a. the input to Exclusive OR gate 27 from $C_4$ is 0 while other input into Exclusive OR gate 27 from the Q output of flip-flop 20*e* is 1. Thus the output of Exclusive OR gate 27 is 1, which appears both at flip-flop 20*g* and at one of the inputs to NOR gate 29. This input of 1 into NOR gate 29, regardless of its other input, forces its output to be 0 which represents one input into Exclusive OR gate 28. The other input into Exclusive OR gate 28 from flip-flop 20*f* is also 0. This results in a 0 output from Exclusive OR gate 18 which is provided to the D input of flip-flop 20*h*.

The next (4th) clock pulse then loads the 1 from flip-flop 19*c* into flip-flop 19*d;* the 0 from flip-flop 19*b* into flip-flop 19*c;* the 1 from flip-flop 19*a* into flip-flop 19*b* and the 1 from serial-in 13 into flip-flop 19*a*. The same clock pulse loads the 0 output of Exclusive OR gate 28 into flip-flop 20*h;* the 1 output of Exclusive OR gate 27 into flip-flop 20*g* and 1 from $\Sigma_4$ into flip-flop 20*f;* the 1 from $\Sigma_3$ into flip-flop 20*e;* the 1 from $\Sigma_2$ into flip-flop 20*d;* the 0 from $\Sigma_1$ into flip-flop 20*c;* and the 1 from serial-in 13 into flip-flop 20*a*.

During the fourth cycle, the 4-bit register 19 contains the number 1011 (decimal 11), which is the number to be squared, while the 8-bit register 20 contains the number 01111001 (decimal 121) as shown in FIG. 2. The number in the 8-bit register 20 is indeed the square of the number to be squared in the 4-bit register 19. At this point, the result of the computation could be provided by a parallel output as exemplified by outputs 36, 37, 38 and 39 for the four most significant bits in the 8-bit register. Alternatively the result can be taken serially by serial-out 35, clock-2 at 30, inverter 32, and NAND gates 31, 33 and 34.

During the fourth cycle, flip-flop 20*h* has a 0 and flip-flop 20*g* a 1. During the first half of the cycle, clock-2 at 30 provides a 1 input to NAND gate 31 which when combined with the 0 from flip-flop 20*h* causes NAND gate 31 to have an output of 1. During the same half cycle, inverter 32 converts the 1 from clock-2 at 30 to a 0, which combines with the 1 from flip-flop 20*g* to give NAND gate 33 an output of 1. The two inputs to NAND gate 34 are the two 1's from NAND gates 31 and 33 and causes NAND gate 34 to have an output of 0, accurately reflecting the contents of flip-flop 20*h*.

During the second half of the fourth cycle, clock-2 at 30 provides a 0 to NAND gate 31 which combines with the 0 from flip-flop 20*h* to give NAND gate 31 an output of 1. During the same half cycle, the 0 from clock 2 at 30 is converted by inverter 32 into a 1 input to NAND gate 33. The other input to NAND gate 33 is a 1 from flip-flop 20*g*. Since both inputs to NAND gate 33 are 1, its output is 0. The O input to NAND gate 34 from NAND gate 33 and the one input from NAND gate 31 force NAND gate 34 to have a 1 output at serial-out 35 accurately reflecting the contents of flip-flop 20*g* during the second half of the fourth cycle. The fifth clock pulse brings the two 1's in the third and fourth most significant places in the 8-bit register into flip-flops 20*g* and 20*h*. During each half cycle of the fifth cycle, a 1 will appear as the output of NAND gate 34 at serial-out 35. This process can continue for two further cycles to obtain all of the bits in the 8-bit register or be terminated at the end of the fifth cycle, after providing the four most significant bits of the square.

Alternates to the circuit of FIG. 1, apparatus may be envisioned to accomplish the computations of the present invention. FIGS. 3 and 4 give two examples. In both of these, 40*a*, 40*b*, 40*c* and 40*d* represent a 4-bit register 40 and 46*a*, 46*b*, 46*c*, 46*d*, 46*e*, 46*f*, 46*g* and 46*h* an 8-bit register 46, although other number storing means would also suffice. 42*a*, 42*b*, 42*c* and 42*d* represent an addition controller 42, and 44*b*, 44*c* and 44*d* form a 4-bit adder 44. An input terminal is shown at 48, a clear terminal at 50, and a clock terminal at 52. Clearly both of these figures could be extended to allow for the computation of arbitrarily large binary numbers. Further, both figures could accommodate a parallel input into 4-bit register 40 with the addition controller 42 controlling and directing the bits from the 4-bit register 40 that are to be added in accordance with the dictated procedure.

Further FIG. 3 shows an apparatus in which the results of the 4-bit adder 44 operations are placed into the 8-bit register 46 in the locations where the bits were taken from when they were added to the 4-bit register 40. Subsequently, it will be necessary for the bits in the 8-bit register 46 to be shifted two places in the direction of increased significance, which can be accomplished, for example, by a pulse or pulses from clock 52. FIG. 4 shows a 4-bit adder 44 in which significance of the bits are increased by 1 as they are replaced in the 8-bit register 46. This requires subsequently increasing the significance of each bit by 1 which again could be accomplished by a pulse from clock 52.

What is claimed is:

1. An apparatus for obtaining the square of an n-bit binary number which comprises:

a. means for storing a number having no more than $n-1$ bits;

b. means for storing a $2n$-bit number;

c. means for each integer $i > 0$, $i \leqslant n-1$, for detecting the value of the $(i+1)^{th}$ most significant bit of said binary number;

d. means for each of said $i$, coupled to said $(n-1)$-bit storing means and to said $2n$-bit storing means and responsive to said detecting means for, when the $(i+1)^{th}$ most significant bit of said binary number is 1, adding the smaller number formed from the i most significant bits in sequence of said binary number in said $(n-1)$-bit storing means to the number in said $2n$-bit storing means and for increasing the significance of each bit in the number in said $2n$-bit storing means by two; and e. means coupled to said $2n$-bit storing means and to said detecting means for adding the value of the $(i+1)^{th}$ most significant bit of said binary number to the number in said $2n$-bit storing means.

2. An apparatus for obtaining the square of an $n$-bit binary number which comprises:

a. means for storing said $n$-bit binary number;

b. means for storing a $2n$-bit binary number;

c. means for each integer $i > 0$, $i \leqslant n-1$ coupled to said n-bit storing means for detecting the value of the $(i+1)^{th}$ most significant bit of said $n$-bit binary number;

d. means coupled to said $n$-bit and said $2n$-bit storing means and said detecting means and responsive to said detecting means for adding the smaller number formed from the i most significant bits in sequence of said $n$-bit binary number to the number in said $2n$-bit storing means when the $(i+1)^{th}$ bit of said number is 1;

e. means coupled to said $2n$-bit storing means for shifting the bits of the number stored in the $2n$-bit storing means from the position of $j$-significance to the position of $j+2$-significance where $1 \leq j \leq 2n-2$; and f. means coupled to and responsive to said detecting means and coupled to said $2n$-bit storing means for adding the value of the $(i+1)^{th}$ most significant bit to said $2n$-bit storing means.

3. The apparatus of claim 2 including means coupled to said $n$-bit storing means for shifting each bit in said $n$-bit storing means to a position in said $n$-bit storing means wherein its significance is increased by 1.

4. The apparatus of claim 3 wherein said adding means of paragraph (d) and said $2n$-bit shifting means for $1 \leq j \leq n$, forms the sum of a. the bits in the $j^{th}$ least significant positions in said $n$-bit and said $2n$-bit storing means, and b. when $j > 1$, the carry from the similar addition of the $(j-1)^{th}$ least significant bits and its carry, and places the least significant bit of said sum in the $(j+2)^{th}$ least significant position of said $2n$-bit storing means.

5. An apparatus for forming the square of an $n$-bit binary number sequentially available with the most significant bit appearing first which comprises:

a. an $n$-bit register with positions from a most significant position to a least significant position;

b. a $2n$-bit register with positions from a most significant position to a least significant position;

c. means for each integer $i > 0$, $i \leq (n-1)$, for detecting the value of the $(i+1)^{th}$ most significant bit of said $n$-bit binary number;

d. means coupled to said detecting means and to said $n$-bit and $2n$-bit registers and responsive to said detecting means for adding the contents of said $n$-bit register to said $2n$-bit register when the next succeedingly available bit of said binary number is 1;

e. means coupled to said $2n$-bit register for shifting the contents of said $2n$-bit register two positions in the direction of the most significant position thereof;

f. means coupled to said detecting means and to said $2n$-bit register for adding said next succeedingly available bit of said binary number to said $2n$-bit register;

g. means coupled to said $n$-bit register for shifting the contents of said $n$-bit register one position in the direction of said most significant position thereof; and h. means coupled to said $n$-bit register for loading said next succeedingly available bit of said binary number into said $n$-bit register.

6. The apparatus of claim 5 wherein said adding means of paragraph (d) for $0 < j \leq n$ forms the sum of the $j^{th}$ least significant bit in said $n$-bit register, the $j^{th}$ least significant bit in said $2n$-bit register and the carry from the similar sum formed from the $(j-1)^{th}$ least significant bits and its carry, and places the least significant bit of said sum in the $j^{th}$ least significant position of said $2n$-bit register prior to the shifting by said $2n$-bit shifting means of said $2n$-bit register.

7. The apparatus of claim 5 wherein said adding means of paragraph (*d*) and said $2n$-bit register shifting means for $0 < j \leq n$ forms the sum of a. the $j^{th}$ least significant bit of said $n$-bit register, b. the $j^{th}$ least significant bit of said $2n$-bit register, and c. the carry of the similar addition of the $(j-1)^{th}$ least significant bit and its carry and places the least significant bit of said sum in the $(j+1)^{th}$ or $(j+2)^{th}$ least significant position of said $2n$-bit register.

8. An apparatus for forming the square of a binary number for use with a binary digital computer having a computer clock terminal, a computer clear terminal, and an input terminal whereat said binary number is sequentially available with the most significant bit appearing first which comprises:

a. an $n$-bit register with positions from a least significant position to a most significant position;

b. a $2n$-bit register with positions from a least significant position to a most significant position;

c. means for detecting the value of the next available bit;

d. sum-forming means coupled to said $n$-bit and $2n$-bit registers and to said detecting means, and responsive to said detecting means for forming upon a clock pulse, when the value of the next available bit is 1, the sum of said $2n$-bit register and said $n$-bit register, and placing said sum in said $2n$-bit register in a manner such that the position of each bit will have a significance two greater than that obtained from forming said sum;

e. means coupled to said $n$-bit register for shifting upon a clock pulse each bit in said $n$-bit register to a position with an increase of one in significance; and f. means coupled to said $n$-bit register for upon a clock pulse loading said next appearing bit in the said least significant position of said $n$-bit register.

9. The apparatus of claim 8 wherein said means for forming the sum of said $n$-bit and $2n$-bit registers a. forms if said next available bit is 1 for each $1 \leq j \leq n$ the sum of (a) the $j^{th}$ least significant bit in said $n$-bit register, (b) the $j^{th}$ least significant bit in said $2n$-bit register and (c) for $j > 1$ the carry of the similar addition of the $(j-1)^{th}$ least significant bits and their carry, b. places the least significant bit of said sum formed from said $j^{th}$ least significant bits in the $j^{th}$ least significant position of said $2n$-bit register, and c. further includes means for shifting upon a clock pulse each bit of said $2n$-bit register to the position in said $2n$-bit register having an increase of 2 in significance.

10. The apparatus of claim 8 wherein said sum-forming means includes for each $j$, where $1 \leq j \leq n$, an adder the inputs of which are coupled to a. the $j^{th}$ least significant bit of said $n$-bit register, b. the $j^{th}$ least significant bit of said $2n$-bit register, and c. for $j > 1$ the most significant bit from the $(j-1)^{th}$ adder the least significant bit of the outputs of which adder is connected to the $(j+2)^{th}$ least significant bit of said $2n$-bit register and the most significant bit, where $j < n$ is connected as a carry to one of the inputs of the $(j+1)$ adder.

11. The apparatus of claim 10 wherein said sumforming means includes for each $j$, $1 \leq j \leq n$, additioncontrolling means through which said $j^{th}$ least significant bit in said $n$-bit register is coupled to said $j^{th}$ adder, the output of said addition-controlling means being connected to said input of said $j^{th}$ adder, to which said $j^{th}$ least significant bit in said $n$-bit register is coupled, and one of the inputs of said addition-controlling means being connected to said $j^{th}$ least significant position in said $n$-bit register.

12. The apparatus of claim 11 wherein for each $j, \leq j \leq n$, said $j^{th}$ addition-controlling means includes an AND gate another input of which is coupled to said input terminal.

13. The apparatus of claim 11 wherein for each $j$, $1 \leq j \leq n$, said $j^{th}$ addition-controlling means is a NOR gate, another input of which is coupled to said input terminal.

14. The apparatus of claim 13 including clearing means coupled to said $n$-bit and $2n$-bit registers for clearing said $n$-bit and said $2n$-bit register upon a command from said computer clear terminal.

15. The apparatus of claim 14 including means coupled to said $2n$-bit register for providing a serial and a parallel output for the square of said binary number.

* * * * *